US009253052B2

(12) United States Patent
Lai et al.

(10) Patent No.: US 9,253,052 B2
(45) Date of Patent: Feb. 2, 2016

(54) INTEGRATION NETWORK DEVICE AND SERVICE INTEGRATION METHOD THEREOF

(71) Applicant: Institute For Information Industry, Taipei (TW)

(72) Inventors: Jen-Yuan Lai, Tainan (TW); Shan Chin, New Taipei (TW); Feng-Sheng Wang, Tainan (TW)

(73) Assignee: Institute For Information Industry, Taipei (TW)

( * ) Notice: Subject to any disclaimer, the term of this patent is extended or adjusted under 35 U.S.C. 154(b) by 192 days.

(21) Appl. No.: 14/012,790

(22) Filed: Aug. 28, 2013

(65) Prior Publication Data

US 2015/0067386 A1    Mar. 5, 2015

(51) Int. Cl.
*G06F 11/00* (2006.01)
*H04L 12/26* (2006.01)
*H04L 1/22* (2006.01)

(52) U.S. Cl.
CPC . *H04L 43/00* (2013.01); *H04L 1/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,403,474 B2* | 7/2008 | Rorie | | H04L 12/4641 370/219 |
| 7,512,830 B2* | 3/2009 | Chu | | G06F 11/2028 714/4.11 |
| 7,760,622 B2* | 7/2010 | Rorie | | H04L 12/4641 370/219 |
| 8,065,559 B2* | 11/2011 | Kamath | | G06F 9/505 714/10 |
| 8,432,791 B1* | 4/2013 | Masters | | H04L 1/22 370/221 |
| 8,554,981 B2* | 10/2013 | Schmidt | | G06F 11/203 711/6 |
| 8,621,261 B2* | 12/2013 | Baird et al. | | 714/4.11 |
| 8,730,795 B2* | 5/2014 | Taylor | | H04L 12/4641 370/225 |
| 8,856,339 B2* | 10/2014 | Mestery | | H04L 67/10 709/226 |
| 2003/0023895 A1* | 1/2003 | Sinha | | G06F 11/2017 714/5.11 |
| 2008/0189700 A1* | 8/2008 | Schmidt | | G06F 11/203 718/1 |
| 2009/0276772 A1* | 11/2009 | Garrett | | G06F 9/455 718/1 |
| 2010/0125903 A1* | 5/2010 | Devarajan | | G06F 21/577 726/15 |
| 2013/0058209 A1* | 3/2013 | Zhu | | H04W 4/005 370/221 |
| 2013/0275974 A1 | 10/2013 | Cao et al. | | |
| 2015/0052382 A1* | 2/2015 | Sarisky | | G06F 11/2025 714/4.11 |
| 2015/0212910 A1* | 7/2015 | Gondi | | G06F 11/1438 714/6.3 |

* cited by examiner

FOREIGN PATENT DOCUMENTS

| | | |
|---|---|---|
| JP | 2012230641 A | 11/2012 |
| SG | 185175 A1 | 11/2012 |
| WO | 2012053393 A1 | 4/2012 |

OTHER PUBLICATIONS

Office Action to the corresponding Japanese Patent Application rendered by the Japan Patent Office (JPO) on Mar. 3, 2015, 5 pages.

*Primary Examiner* — Amine Riad
(74) *Attorney, Agent, or Firm* — Skaar Ulbrich Macari, P.A.

(57) ABSTRACT

An integration network device and a service integration method thereof are provided. The integration network device receives a connecting request from the VDI user device. The integration network device establishes a connection between the VDI user device and the first management network device according to the connecting request. The integration network device determines that the first management network device fails the connection according to a first management information of the first management network device. The integration network device routes the VDI user device to the second management network device according to a second management information of the second management network device.

12 Claims, 5 Drawing Sheets

INTEGRATION NETWORK DEVICE AND SERVICE INTEGRATION METHOD THEREOF

FIELD

The present invention relates to an integration network device and a service integration method thereof; and more particularly, the integration network device and the service integration method thereof according to the present invention are used for the integration of different cloud computing systems.

BACKGROUND

In conventional cloud computing, users can use the resources of the cloud system. Particularly, users can store and access the data in the cloud system; moreover, users can even use the applications deployed at the cloud system end and retrieve the results only. Accordingly, the storage and the computing resource at the user end can be saved efficiently. However, in the existed cloud computing structures, the resources user can use at a time are almost limited in one cloud system.

Further speaking, in the current cloud computing structures, once a user connects to a cloud system, the user can use only the resources of the cloud system. Therefore, since each cloud system works independently, the user's on-going works on one cloud system will be failed directly if the cloud system crashes. In other words, the user's work can not be processed through different cloud systems since each cloud system works independently. Accordingly, the uses of the current cloud systems will be very inflexible and limited.

Hence, an urgent need exists in the art to integrate the different cloud systems for increasing the availability and the flexibility of cloud computing.

SUMMARY

One primary objective of certain embodiments of this invention is to provide a service integration method for use in an integration network device. The integration network device is used in a hybrid cloud computing system. The hybrid cloud computing system comprises the integration network device and a plurality of management network devices. A VDI user device connects to the hybrid cloud computing system via network. The management network devices include a first management network device and a second management network device which are disposed in distinct cloud systems. The first management network device cooperates with at least one first application server. The second management network device cooperates with at least one second application server.

The service integration method according to certain embodiments comprises: (a) enabling the integration network device to receive a connecting request from the VDI user device; (b) enabling the integration network device to establish a connection between the VDI user device and the first management network device according to the connecting request; (c) enabling the integration network device to determine that the first management network device fails the connection according to a first management information, stored in the integration network device, of the first management network device; (d) enabling the integration network device to, after step (c), connect the VDI user device to the at least one second application server according to a second management information, stored in the integration network device, of the second management network device. The first management information relates to an availability of the at least one first application server, and the second management information relates to an availability of the at least one second application server.

Another objective of certain embodiments of this invention is to provide an integration network device for used in a hybrid cloud computing system. The hybrid cloud computing system comprises the integration network device and a plurality of management network devices. A VDI user device connects to the hybrid cloud computing system via network. The management network devices include a first management network device and a second management network device which are disposed in distinct cloud systems. The first management network device cooperates with at least one first application server. The second management network device cooperates with at least one second application server.

The integration network device according to certain embodiments comprises a transceiver, a processing unit and a storage unit. The transceiver is configured to receive a connecting request from the VDI user device. The storage unit is configured to store a first management information of the first management network device and a second management information of the second management network device. The first management information relates to an availability of the at least one first application server and the second management information relates to an availability of the at least one second application server. The processing unit is configured to establish a connection between the VDI user device and the first management network device via the transceiver according to the connecting request, to determine that the first management network device fails the connection according to a first management information, and to connect the VDI user device to the at least one second application server according to the second management information via the transceiver.

The detailed technology and preferred embodiments implemented for the subject invention are described in the following paragraphs accompanying the appended drawings for people skilled in this field to well appreciate the features of the claimed invention.

DETAILED DESCRIPTION

The present invention may be explained with reference to the following example embodiments thereof. However, these example embodiments are not intended to limit the present invention to any specific examples, embodiments, environments, applications or implementations described in these example embodiments. Therefore, description of these example embodiments is only for purpose of illustration rather than to limit the present invention. In the following embodiments and the attached drawings, elements not directly related to the present invention are omitted from depiction; and dimensional relationships among individual elements in the attached drawings are illustrated only for ease of understanding but not to limit the actual scale.

Figure 1A:
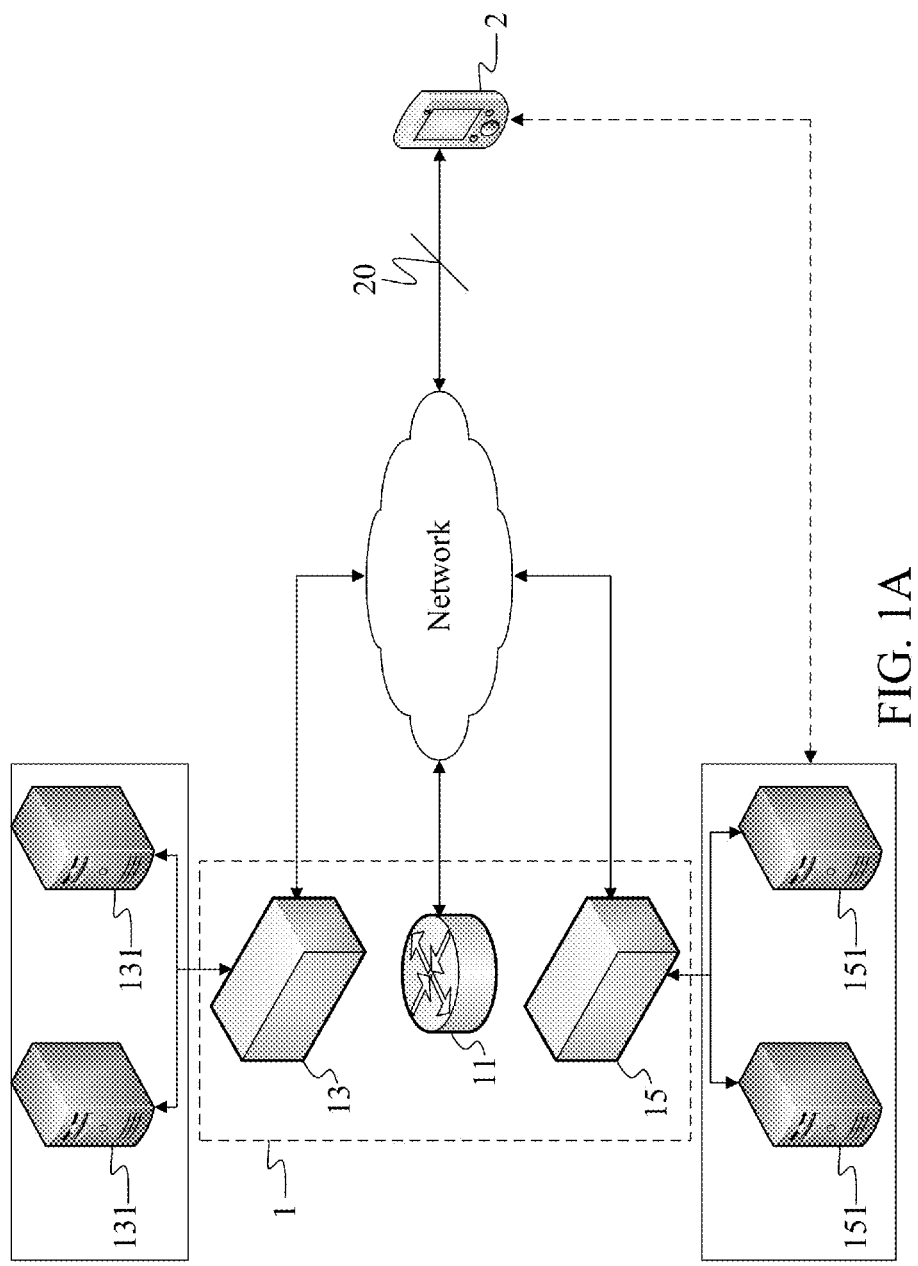
FIG. 1A is a schematic view of a network environment of an integration network device according to the first embodiment of the present invention.
Figure 1B:
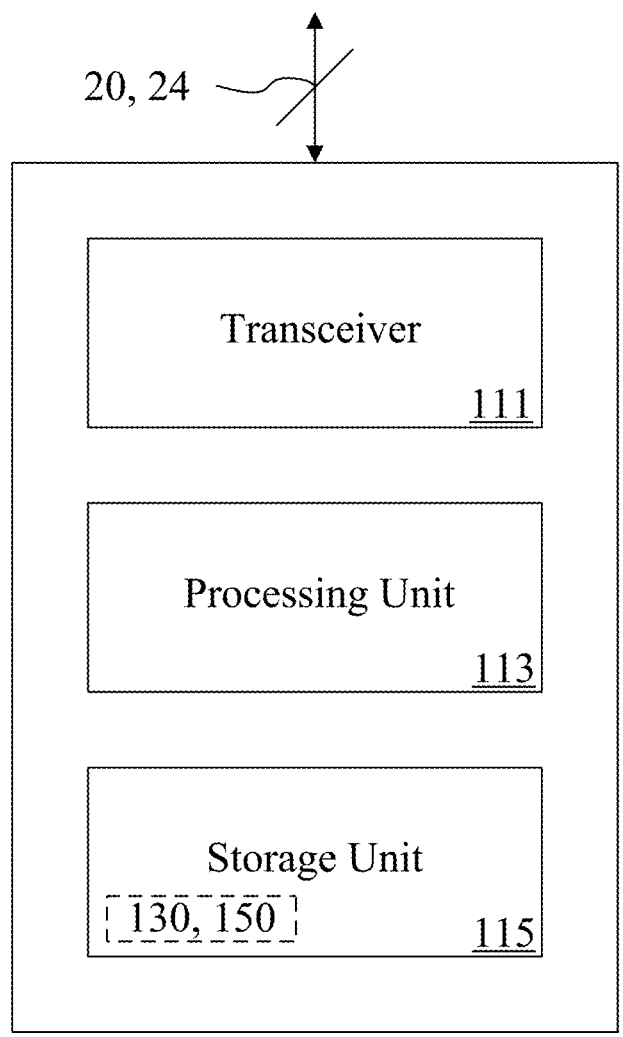
FIG. 1B is a block diagram of the integration network device according to the first embodiment of the present invention.

Refer to FIG. 1A and FIG. 1B. FIG. 1A is a schematic view of a network environment of an integration network device 11 according to a first embodiment of the present invention. The integration network 11 device is used in a hybrid cloud computing system 1. The hybrid cloud computing system 1 further comprises a plurality of management network devices. In the first embodiment, the management network devices include a first management network device 13 and a second management network device 15 which are disposed in distinct cloud systems.

The first management network device 13 cooperates with at least one first application server 131 (There are two first application servers in the first embodiment). The second management network device cooperates with at least one second application server 151 (There are two second application servers in the first embodiment). A VDI user device 2 connects to the hybrid cloud computing system 1 via network. FIG. 1B is a block diagram of the integration network device 11 according to the first embodiment of the present invention. The integration network device 11 comprises a transceiver 111, a processing unit 113 and a storage unit 115.

It should be noted first that the storage unit 115 stores a first management information 130 of the first management network device 13 and a second management information 150 of the second management network device 15. The first management information 130 relates to an availability of the first application servers 131, the second management information 150 relates to an availability of the second application servers 151, and the first management information 130 and the second management information 150 are updated in the storage unit 115 in real-time for the latest states of the first management network device 13 and the second management network device 15. Interactions between the network components will be further elucidated hereinbelow.

Firstly, when a user wants to use an application deployed on the hybrid cloud computing system 1, the user logins the integration network device 11 though the VDI user device 2 via network and transmits a connecting request 20. Then, after the transceiver 111 of the integration network device 11 receives the connecting request 20, the processing unit 113 of the integration network device 11 is capable of establishing a connection (not shown) between the VDI user device 2 and the first management network device 13 via the transceiver 111 according to the connecting request 20.

Next, since the storage unit 115 of integration network device 11 stores the first management information 130 which relates to the availability of the first application servers 131, the processing unit 113 of the integration network device 11 is capable of determining if the connection can be successful. In the first embodiment, the VDI user device 2 can not connect to the first application servers 131 because the first application servers 131 crashed or all the sessions of the first application servers 131 have been occupied. Accordingly, the processing unit 113 of the integration network device 11 determines that the first management network device 13 fails the connection according to the first management information 130.

Afterwards, since the storage unit 115 of integration network device 11 stores the second management information 150 which relates to the availability of the second application server 131 and indicates that the second application servers 151 possess the resources for the VDI user device 2, the processing unit 113 of the integration network device 11 connects the VDI user device 2 to the second application servers 151 according to the second management information 150 via the transceiver 111. Therefore, the VDI user device 2 is capable of accessing the second application servers 151 via VDI protocol. It is noted that the VDI protocol should be know by the people in the art; therefore, it will not be further described.

It should be noted that, in details, there are two implementations of connecting the VDI user device 2 to the second application servers 151. In the first implementation, the processing unit 113 of the integration network device 11 mounts the second application servers 151 (both or one of them) from the second management network device 15 to the first management network device 13 according to the second management information 150.

More specifically, since there is already a connection between the first management network device 13 and the VDI user device 2 and the VDI user device 2 needs the resources of the second application servers 151, the processing unit 113 can mount the second application servers 151 from the second management network device 15 to the first management network device 13 according to the second management information 150 and connect the VDI user device 2 to the second application servers 151 via the transceiver 111 so that the VDI user device 2 is capable of accessing the resources of the second application servers 151.

On the other hand, in the second implementation, the processing unit 113 of the integration network device 11 routes the VDI user device 2 to the second management network device 15 (both or one of them) according to the second management information 150. More specifically, since the processing unit 113 determined that the first management network device 13 fails the connection with the VDI user device 2, the processing unit 113 can route the VDI user device 2 to the second management network device 15 and connect the VDI user device 2 to the second application servers 151 via the transceiver 111 so that the VDI user device 2 is capable of accessing the resources of the second application server 151.

In the hybrid cloud computing system 1 described in the first embodiment, when VDI user device 2 tries to connect to the first management network device 13 and access the first application servers 131, the integration network device 11 is capable of determining whether the first application servers 131 crashed or the sessions of the first application servers 131 have been occupied, and then connects the VDI user device 2 to available management network device which is the second management network device 15 in the first embodiment.

Figure 2:
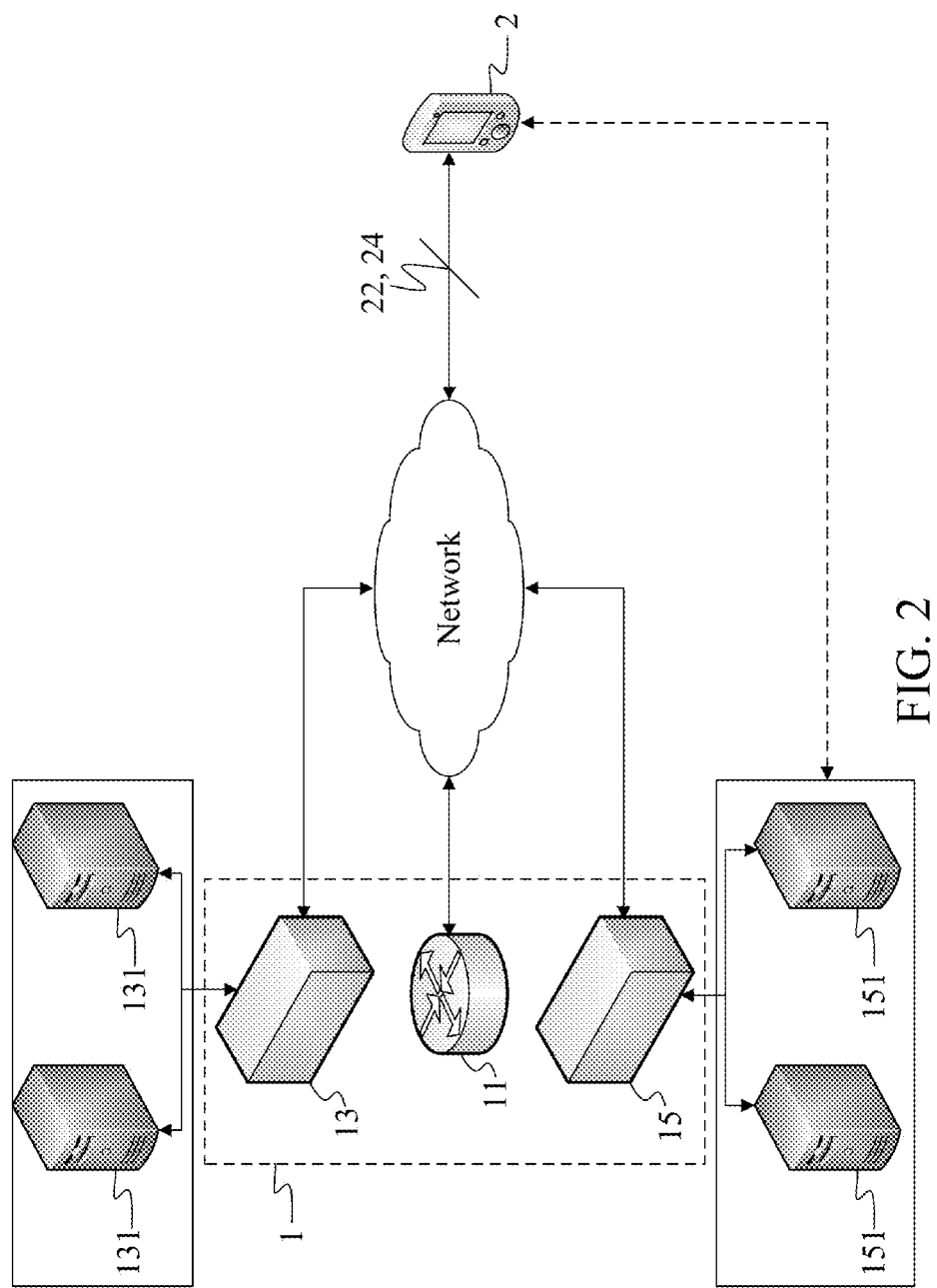
FIG. 2 is a schematic view of another network environment of the integration network device according to the second embodiment of the present invention.

Please refer to FIG. 2. FIG. 2 is a schematic view of another network environment of the integration network device 11 according to a second embodiment of the present invention. It shall be particularly noted that, the network structure structures of the second embodiment are similar to those of the first embodiment, so components bearing the same reference numerals have the same functions and will not be further described herein. The second embodiment gives more implemented details of the service integration method of the present invention.

Similarly, when a user wants to use an application deployed on the hybrid cloud computing system 1, the user logins the integration network device 11 though the VDI user device 2 via network and transmits a connecting request 22. Then, after the transceiver 111 of the integration network device 11 receives the connecting request 22, the processing unit 113 of the integration network device 11 is capable of establishing a connection (not shown) between the VDI user device 2 and the first management network device 13 via the transceiver 111 according to the connecting request 22.

Next, since the storage unit 115 of integration network device 11 stores the first management information 130 which relates to the availability of the first application servers 131, the processing unit 113 of the integration network device 11 is capable of determining if the connection can be successful. In the second embodiment, the first application servers 131 work well and posses the resources for the VDI user device 2. Accordingly, the processing unit 113 of the integration network device 11 connects the VDI user device 2 to the first management network device 13 via the transceiver based on the connection. Therefore, the VDI user device 2 is capable of accessing the first application servers 131 via VDI protocol.

However, systems crash or the sessions are not enough sometimes. Accordingly, if the first management network device 13 crashed or the sessions of the first management network device 13 have been decreased afterward, and the unavailable state of the first management network device 13 is updated to the first management information 130 stored in the storage unit 115 of the integration network device 11, the processing unit 113 of the integration network device 11 determines that the first management network device 13 fails the connection according to the first management information 130.

Then, similarly, since the storage unit 115 of integration network device 11 stores the second management information 150 which relates to the availability of the second application server 131 and indicates that the second application servers 131 possess the resources for the VDI user device 2, the processing unit 113 of the integration network device 11 seamlessly connects the VDI user device 2 to the second application servers 151 according to the second management information 150 via the transceiver 111.

Therefore, the VDI user device 2 is capable of accessing the second application servers 151 via the VDI protocol and kept in the on-going state since the connecting is seamless. It should be noted that, the two implementations of connecting the VDI user device 2 to the second application servers 151 described in the first embodiment can also be applied in the second embodiment seamlessly, and the details will not be further described herein.

Moreover, after routing to the second management network device 15, the VDI user device 2 is capable of requesting use of new VDI application. Specifically, when the user wants to executes new application on the cloud system, the user transmits an application request 24 to the integration network device 11 via the VDI user device 2. In other words, the transceiver 111 of the integration network device 11 receives the application request 24 from the VDI user device 2. Therefore, a VDI application connection (not shown) can be established directly between the VDI user device 2 and the second management network device 15, and the processing unit 113 of the integration network device 11 maintains the VDI application connection.

In the hybrid cloud computing system 1 described in the second embodiment, when VDI user device 2 has connected to the first management network device 13 but failed later, the integration network device 11 is capable of determining if the first application servers 131 is unavailable as well, and then routing the VDI user device 2 to available management network device which is the second management network device 15 in the second embodiment.

It should be noted that it is not intended to limit the numbers of the management network devices and the applications servers of the present invention and those skilled in the art can readily know from the disclosures of the present invention that the numbers of the management network devices and the applications servers can be dynamically increased. In addition, to prevent the crash of the hybrid cloud computing system, redundant device for the integration network device can be deployed.

Figure 3:
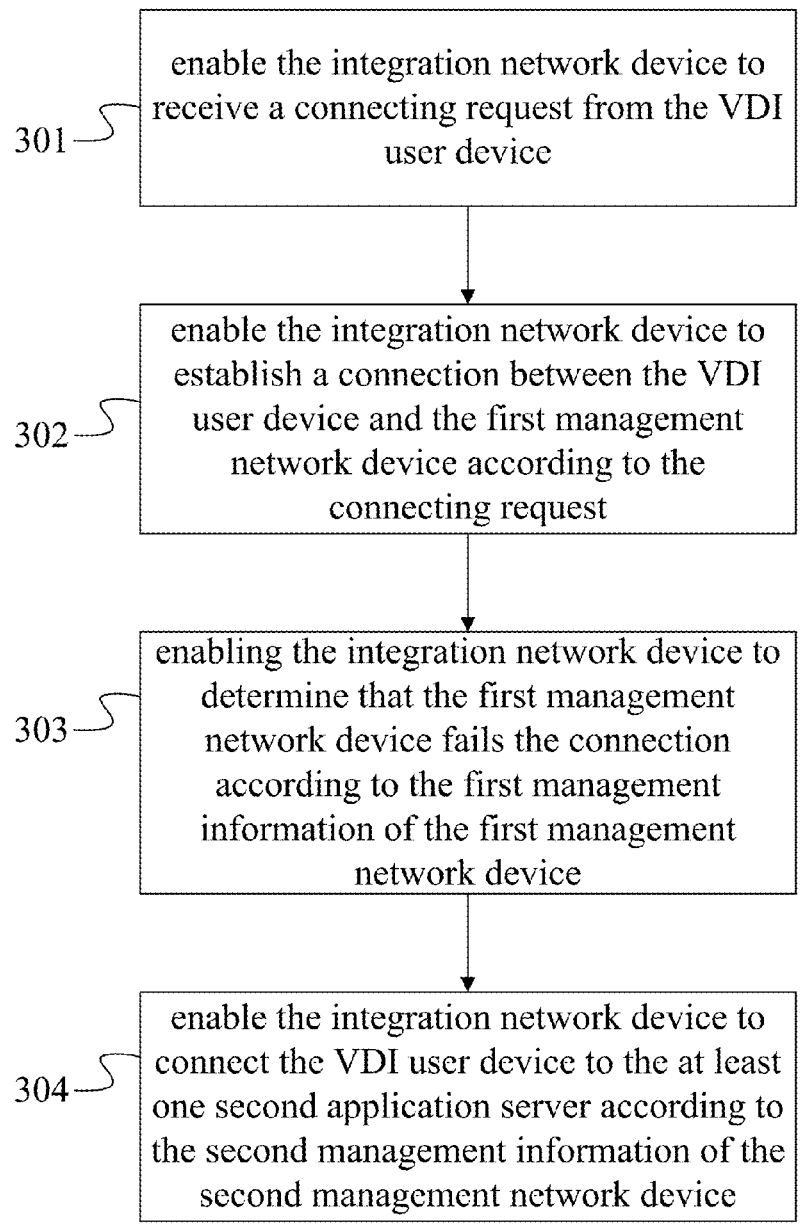
FIG. 3 is a flowchart diagram of a service integration method according to the third embodiment of the present invention.

Referring to FIG. 3, there is shown a flowchart diagram of a service integration method according to a third embodiment of the present invention. The service integration method of the third embodiment is for use in an integration network device (e.g., the integration network device of the first embodiment). The integration network device is used in a hybrid cloud computing system. The hybrid cloud computing system further comprises a plurality of management network devices. The management network devices include a first management network device and a second management network device which are disposed in distinct cloud systems.

The first management network device cooperates with at least one first application server. The second management network device cooperates with at least one second application server. A VDI user device connects to the hybrid cloud computing system via network. It should be noted first that a first management information of the first management network device and a second management information of the second management network device are stored in the integration network device. The first management information relates to an availability of the first application servers, the second management information relates to an availability of the second application servers. Steps of the power adjustment method of the third embodiment will be detailed as follows.

First, step 301 is executed to enable the integration network device to receive a connecting request from the VDI user device. Then, step 302 is executed to enable the integration network device to establish a connection between the VDI user device and the first management network device according to the connecting request.

Step 303 is executed to enabling the integration network device to determine that the first management network device fails the connection according to the first management information of the first management network device. Finally, step 304 is executed to enable the integration network device to connect the VDI user device to the at least one second application server according to the second management information of the second management network device so that the VDI user device is capable of accessing the at least one second application server.

Similarly, step 304 can be implemented in two ways at least. First, since there is already a connection between the first management network device and the VDI user device and the VDI user device needs the resources of the at least one second application server, the integration network device can mount the at least one second application server from the second management network device to the first management network device according to the second management information and connect the VDI user device to the at least one second application server so that the VDI user device is capable of accessing the resources of the at least one second application server.

Secondly, since the integration network device determined that the first management network device failed the connection with the VDI user device, the integration network device can route the VDI user device to the second management network device according to the second management information and connect the VDI user device to the at least one second application server so that the VDI user device is capable of accessing the resources of the at least one second application server.

Figure 4:
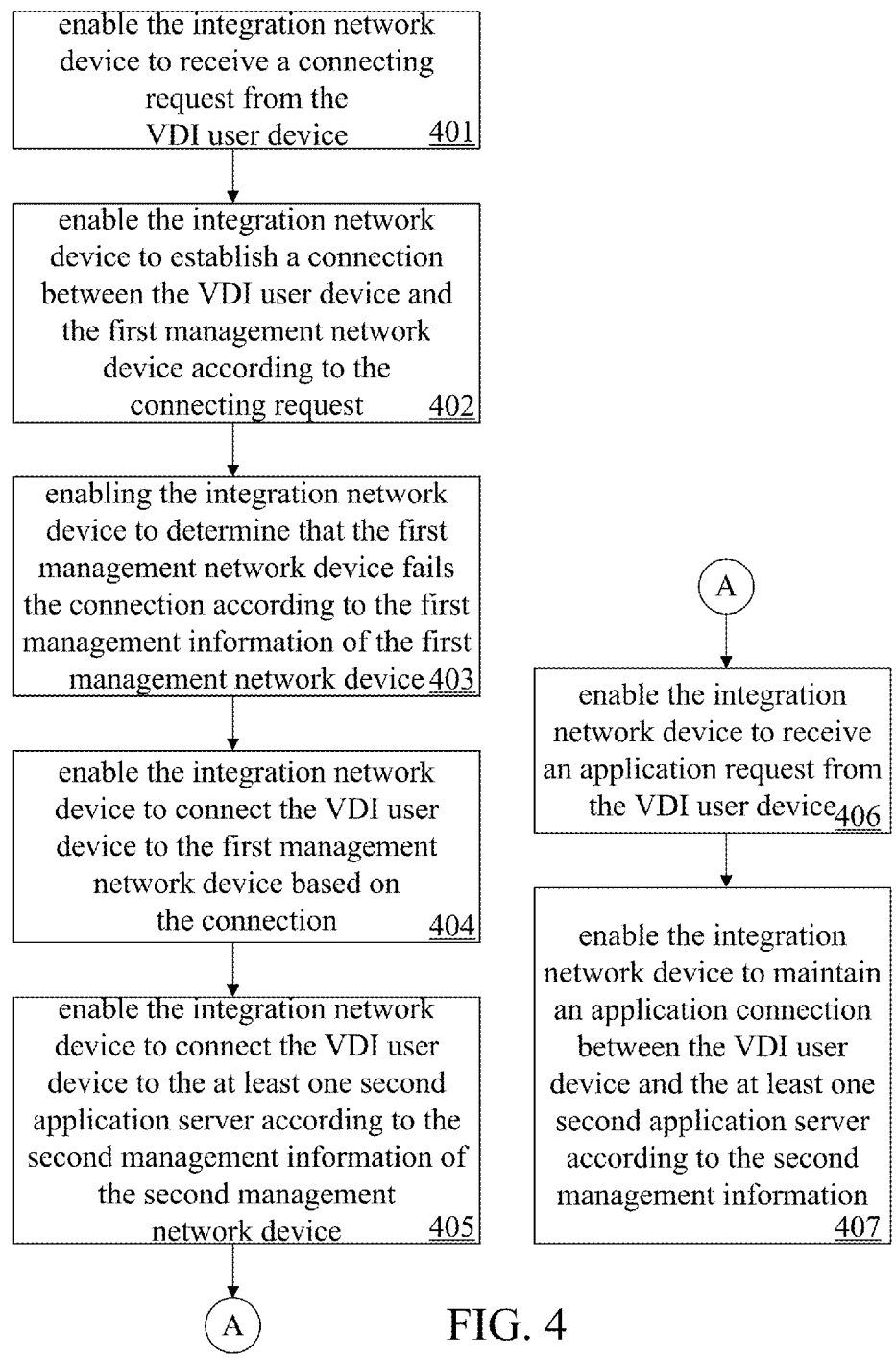
FIG. 4 is a flowchart diagram of a service integration method according to the fourth embodiment of the present invention.

Referring to FIG. 4, there is shown a flowchart diagram of a service integration method according to a fourth embodiment of the present invention. The service integration method of the third embodiment is for use in an integration network device (e.g., the integration network device of the second embodiment). The integration network device is used in a hybrid cloud computing system. The hybrid cloud computing system further comprises a plurality of management network devices. The management network devices include a first management network device and a second management network device which are disposed in distinct cloud systems.

The first management network device cooperates with at least one first application server. The second management network device cooperates with at least one second application server. A VDI user device connects to the hybrid cloud computing system via network. It should be noted first that a first management information of the first management network device and a second management information of the second management network device are stored in the integration network device. The first management information relates to an availability of the first application servers, the second management information relates to an availability of the second application servers. Steps of the power adjustment method of the third embodiment will be detailed as follows.

Similarly, step 401 is executed to enable the integration network device to receive a connecting request from the VDI user device. Step 402 is executed to enable the integration network device to establish a connection between the VDI user device and the first management network device according to the connecting request. Then, if the first management network device is available, step 403 is executed to enable the integration network device to connect the VDI user device to the first management network device based on the connection so that the VDI user device is capable of accessing the at least one first application server.

Afterwards, when the first management network device is unavailable, step 404 is executed to enable the integration network device to determine that the first management network device fails the connection according to the first management information of the first management network device. Step 405 is executed to enable the integration network device to connect the VDI user device to the at least one second application server according to the second management information of the second management network device so that the VDI user device is capable of accessing the at least one second application server.

It should noted that, if new application is needed to be executed, step 406 can be executed to enable the integration network device to receive an application request from the VDI user device, and step 407 is then executed to enable the integration network device to maintain an application connection between the VDI user device and the at least one second application server according to the second management information.

According to the above descriptions of the integration network device and the service integration method thereof of the present invention, the different cloud systems are integrated for increasing the availability and the flexibility of cloud computing, and the user can use the resources of the hybrid cloud computing system simultaneously.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A service integration method for use in an integration network device, the integration network device being used in a hybrid cloud computing system, the hybrid cloud computing system comprising the integration network device and a plurality of management network devices, a virtual desktop infrastructure (VDI) user device connecting to the hybrid cloud computing system via network, the management network devices including a first management network device and a second management network device which are disposed in distinct cloud systems, the first management network device cooperating with at least one first application server, the second management network device cooperating with at least one second application server, the service integration method comprising:
(a) enabling the integration network device to receive a connecting request from the VDI user device;
(b) enabling the integration network device to establish a connection between the VDI user device and the first management network device according to the connecting request;
(c) enabling the integration network device to determine that the first management network device fails the connection according to a first management information, stored in the integration network device, of the first management network device, wherein the first management information relates to an availability of the at least one first application server;
(d) enabling the integration network device to, after step (c), connect the VDI user device to the at least one second application server according to a second management information, stored in the integration network device, of the second management network device, wherein the second management information relates to an availability of the at least one second application server.

2. The service integration method as claimed in claim 1, wherein step (d) further comprises the following steps:
(d1) enabling the integration network device to mount the at least one second application server from the second management network device to the first management network device according to the second management information; and
(d2) enabling the integration network device to connect the VDI user device to the at least one second application server.

3. The service integration method as claimed in claim 1, wherein step (d) further comprises the following steps:
(d1) enabling the integration network device to route the VDI user device to the second management network device according to the second management information; and
(d2) enabling the integration network device to connect the VDI user device to the at least one second application server.

4. The service integration method as claimed in claim 1, further comprising the following step before step (c):
(c1) enabling the integration network device to connect the VDI user device to the first management network device based on the connection so that the VDI user device is capable of accessing the at least one first application server via VDI protocol.

5. The service integration method as claimed in claim 1, further comprising the following step after step (d):
  (e) enabling the integration network device to receive an application request from the VDI user device; and
  (f) enabling the integration network device to, after receiving the application request, maintain a VDI application connection between the VDI user device and the at least one second application server according to the second management information.

6. The service integration method as claimed in claim 1, wherein the integration network device connects the VDI user device to the at least one second application server seamlessly.

7. An integration network device for used in a hybrid cloud computing system, the hybrid cloud computing system comprising the integration network device and a plurality of management network devices, VDI user device connecting to the hybrid cloud computing system via network, the management network devices including a first management network device and a second management network device which are disposed in distinct cloud systems, the first management network device cooperating with at least one first application server, the second management network device cooperating with at least one second application server, the integration network device comprising:
  a processing unit;
  a transceiver, being configured to receive a connecting request from the VDI user device; and
  a storage unit, being configured to store a first management information of the first management network device and a second management information of the second management network device, wherein the first management information relates to an availability of the at least one first application server and the second management information relates to an availability of the at least one second application server;
  wherein the processing unit is configured to establish a connection between the VDI user device and the first management network device via the transceiver according to the connecting request, to determine that the first management network device fails the connection according to a first management information, and to connect the VDI user device to the at least one second application server according to the second management information via the transceiver.

8. The integration network device as claimed in claim 7, wherein the processing unit is further configured to mount the at least one second application server from the second management network device to the first management network device according to the second management information, and to connect the VDI user device to the at least one second application server via the transceiver.

9. The integration network device as claimed in claim 7, wherein the processing unit is further configured to route the VDI user device to the second management network device according to the second management information, and to connect the VDI user device to the at least one second application server via the transceiver.

10. The integration network device as claimed in claim 7, wherein the processing unit is further configured to connect the VDI user device to the first management network device via the transceiver based on the connection before the first management network device fails the connection so that the VDI user device is capable of accessing the at least one first application server via VDI protocol.

11. The integration network device as claimed in claim 7, wherein the processing unit is further configured to maintain an application connection between the VDI user device and the at least one second application server according to the second management information via the transceiver after the transceiver receives an application request from the VDI user device.

12. The integration network device as claimed in claim 7, wherein the processing unit is further configured to connect the VDI user device to the at least one second application server via the transceiver seamlessly.

\* \* \* \* \*